United States Patent [19]

Okita et al.

[11] Patent Number: 4,719,526
[45] Date of Patent: Jan. 12, 1988

[54] DISK MEMORY DEVICE

[75] Inventors: Masao Okita; Atsushi Iwanaga, both of Furukawa, Japan

[73] Assignee: Alps Electric Co., Ltd., Japan

[21] Appl. No.: 797,248

[22] Filed: Nov. 12, 1985

[30] Foreign Application Priority Data

Nov. 10, 1984 [JP] Japan .......................... 59-169811[U]

[51] Int. Cl.⁴ ............................................. G11B 23/02
[52] U.S. Cl. ....................................................... 360/97
[58] Field of Search ............. 310/91; 360/96.5, 97–99, 360/137

[56] References Cited

U.S. PATENT DOCUMENTS

| 3,536,280 | 10/1970 | Barlow | 310/91 X |
| 3,544,048 | 12/1970 | Oshima et al. | 248/13 |
| 3,886,595 | 5/1975 | Swain et al. | 360/106 |
| 4,546,396 | 10/1985 | Schatteman | 360/96.5 |
| 4,553,183 | 11/1985 | Brown et al. | 360/97 X |

FOREIGN PATENT DOCUMENTS 2082371A 3/1982 United Kingdom .

Primary Examiner—John H. Wolff
Attorney, Agent, or Firm—Guy W. Shoup

[57] ABSTRACT

A disk memory device includes a housing, a front panel attached to the housing and having a slot for insertion of a memory disk into the housing, a circuit board fixedly mounted in the housing, a mechanism including at least a disk drive unit and accommodated in the housing, and vibroisolating members fixed to the housing for isolating the mechanism from vibrations applied to the housing.

7 Claims, 6 Drawing Figures

DISK MEMORY DEVICE

BACKGROUND OF THE INVENTION

The present invention relates to a disk memory device such as a magnetic disk memory or an optical disk memory, and more particularly to a disk memory device for use with replaceable disks.

As recent years have seen the miniaturization of disk memory devices and computers and the advances of computer-applied technology, there is a demand for portable disk memory devices as well as portable computers. The portable disk memory devices desired are not of the type which can be used while the user is walking, like cassette tape recorders, but of the type which can be operated on the lap of the user while in automobiles, airplanes, or at the sites of business transactions. Although the portable computers now available are sufficiently resistant to vibrations, the conventional disk memory devices such as magnetic disk memories are not sufficiently vibration-resistant. There has been proposed a disk memory device in which the disk is not replaceable, the disk memory device being bodily attachable to a computer by a vibration-resistant member such as a coil spring, an oil damper, or a rubber bushing.

Many disk memory devices for use with replaceable disks include a front panel having a slot through which a disk can be inserted. If such a disk memory device were attached to a computer by a coil spring, an oil damper, or a rubber bushing, then the disk could not smoothly be inserted into and removed from the disk memory device through the panel slot.

SUMMARY OF THE INVENTION

In view of the problem of the conventional disk memory device, it is an object of the present invention to provide a disk memory device attachable to a computer and including a mechanism which comprises at least a disk drive unit and a head and is sufficiently resistant to vibrations.

The above object can be achieved by a disk memory device including a housing, a front panel attached to the housing and having a slot for insertion of a memory disk into the housing, a circuit board fixedly mounted in the housing, a mechanism including at least a disk drive unit and accommodated in the housing, and a vibroisolating means fixed to the housing for isolating the mechanism from vibrations applied to the housing.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
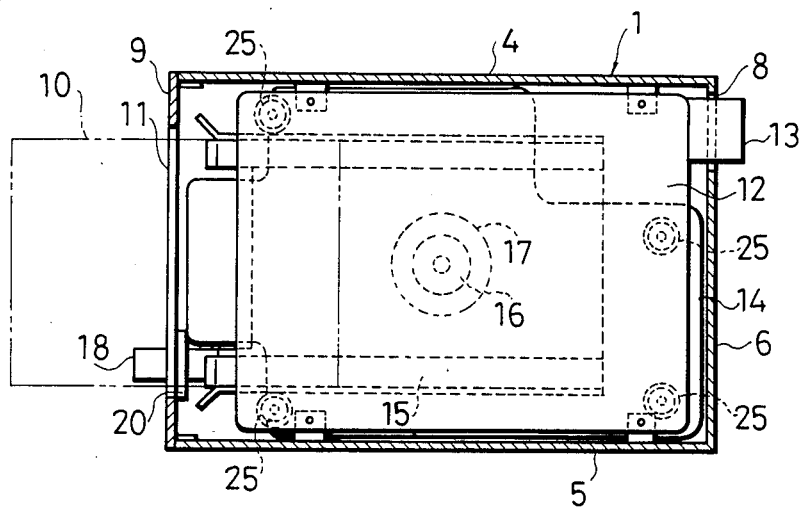
FIG. 1 is a horizontal cross-sectional view of a disk memory device according to the present invention.
Figure 2:
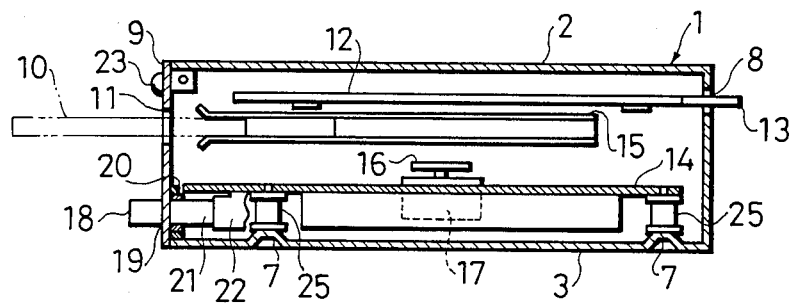
FIG. 2 is a vertical cross-sectional view of the disk memory device shown in FIG. 1.
Figure 3:
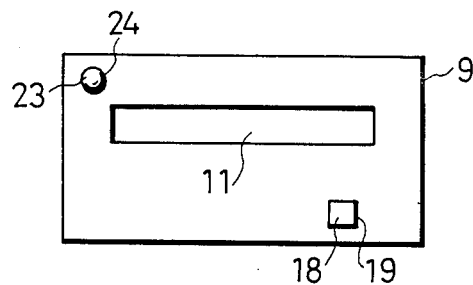
FIG. 3 is a front elevational view of the disk memory device.

As shown in FIGS. 1 through 3, an outer housing 1 for attachment to a computer (not shown) is in the form of a box serving as a shield body. The housing 1 is composed of an upper wall 2, a lower wall 3, a pair of side walls 4, 5, and a rear wall 6. The lower wall 3 has a plurality (four in the illustrated embodiment) of projections or raised portions 7 projecting toward the upper wall 2. The rear wall 6 has a recess 8 defined therein. A front panel 9 is fixed to the housing 1 to cover the front opening thereof. The front panel 9 has a slot 11 for insertion of a disk cartridge 10 therethrough into the housing 1. Although not shown, a shutter is mounted on the inner surface of the front panel 9, the shutter being angularly movable in response to insertion of the disk cartridge 10 through the slot 11 into the housing 1. The disk cartridge 10 contains a magnetic memory disk, for example, therein.

A circuit board 12 is accommodated in the housing 1 and fixed thereto. A connector 13 is attached to an end of the circuit board 12 and projects out of the housing 1 through the recess 8 in the rear wall 6 for connection to the computer.

The housing 1 also houses a support chassis 14, a guide member 15 for guiding the disk cartridge 10 into and out of the housing 1, a table 16 mounted on the support chassis 14 for supporting the disk in the disk cartridge 10, and a motor 17 supported on the support chassis 14 for rotating the table 16. The table 16 and the motor 17 constitute a disk drive unit. The support chassis 14, the guide member 15, the table 16, the motor 17, a magnetic head (not shown) for reading information recorded on the magnetic disk, a device (not shown) for driving the magnetic head, and a device (not shown) for lifting and lowering the guide member 15 jointly constitute a disk memory device mechanism.

An eject button 18 is disposed in a hole 19 defined in the front panel 1 for ejecting the disk cartridge 10 out of the housing 1. The eject button 18 is slidably supported by an upstanding member 20 on a front portion of the lower wall 3 of the housing 1. The eject button 18 has an end 21 held against a lever 22 which is a member of the device for lifting and lowering the guide member 15. As shown in FIG. 3, a lamp 23 for indicating a readout mode projects forward from a hole 24 defined in the front panel 9.

Figure 4:
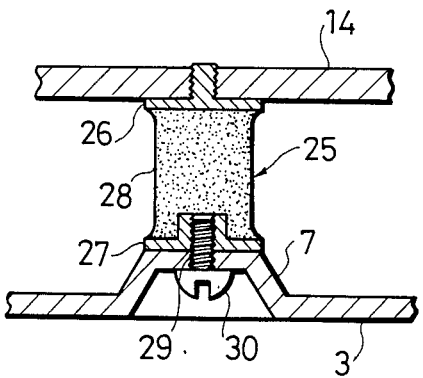
FIG. 4 is an enlarged fragmentary cross-sectional view of a vibroisolating member employed in the disk memory device.

Vibroisolating members 25 are mounted respectively on the raised portions 7 of the lower wall 3 of the housing 1 and support the chassis 14 for isolating the disk memory device mechanism from vibrations. As shown in FIG. 4 at an enlarged scale, each of the vibroisolating members 25 is composed of a first rigid portion 26 having an externally threaded portion threaded into the chassis 14, a second rigid portion 27 disposed on one of the raised portions 7 and having an internally threaded portion, and a rubber member 28 joined between the first and second rigid portions 26, 27. For attaching the vibroisolating member 25 in position, the externally threaded portion of the first rigid portion 26 is threaded into the chassis 14, and then a screw 30 is inserted through a hole 29 defined in the top of the raised portion 7 and threaded into the inernally threaded portion of the second rigid portion 27. The vibroisolating member 25 is now attached to and disposed between the chassis 14 and the raised portion 7. The raised portions 7 and the vibroisolating members 25 are located in respective spaces out of interference with the components of the disk memory device mechanism. Although not shown, the circuit board 12 is connected to the components of the disk memory device mechanism by flexible cords.

In the foregoing arrangement, the circuit board 12 and the eject button 18 are fixed to the housing 1, the eject button 18 and the lever 22 are separate from each other, and the disk memory device mechanism including the disk drive unit is supported by the vibroisolating members 25 on the housing 1. Therefore, the disk memory device mechanism within the housing 1 can be sufficiently isolated from externally induced vibrations transmitted to the housing 1. Any positional error or deviation between the slot 11 in the front panel 9 and the guide member 15, which error would otherwise be caused by vibrations applied to the disk memory device mechanism, can be held to a minimum. As a consequence, the disk cartridge 10 can easily and smoothly be inserted into and removed out of the housing 1.

As the vibroisolating members 25 are positioned out of interference with the components of the disk memory device mechanism in the housing 1, the conventional layout of the components is not required to be changed by the vibroisolating members 25, which can therefore be employed in various disk memory devices.

Inasmuch as the vibroisolating members 25 are housed in the housing 1, they are concealed from view and allow the disk memory device to be sightly in appearance and of good product quality.

Figure 5:
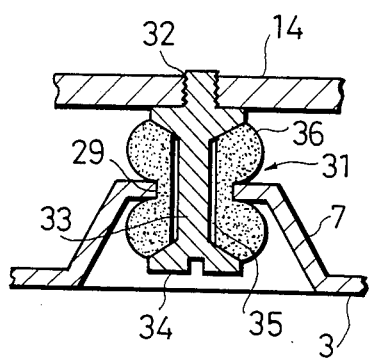
FIG. 5 is an enlarged fragmentary cross-sectional view of another vibroisolating member that can be employed in the disk memory device.

FIG. 5 shows a vibroisolating member 31 according to another embodiment of the present invention. The vibroisolating member 31 is composed of an externally threaded portion 32 threaded in the chassis 14, a rigid portion 34 having connected to the externally threaded portion 32 and a smaller-diameter shank 33, and a rubber member 36 having a central hole 35. In assembly, the externally threaded portion 32 is threaded into a threaded hole in the chassis 14 with the rigid portion 34 inserted in the hole 29 in the raised portion 7. After the vibroisolating member 32 has been fixed to the chassis 14, the rubber member 36 is inserted into the hole 29 while it is threaded over the smaller-diameter shank 33, which now extends through the central hole 35.

Figure 6:
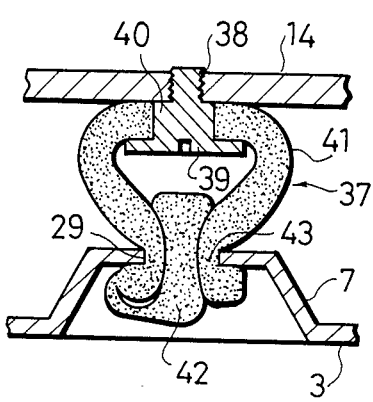
FIG. 6 is an enlarged fragmentary cross-sectional view of still another vibroisolating member that can be employed in the disk memory device.

FIG. 6 illustrates a vibroisolating member 37 according to still another embodiment of the present invention. The vibroisolating member 37 comprises an externally threaded portion 38 threaded in the chassis 14, a rigid portion 40 having a flange 39 and connected to the externally threaded portion 38, a bag-shaped rubber member 41 joined to the rigid portion 40, and a bar-shaped rubber member 42 integrally extending from the bag-shaped rubber member 41. The vibroisolating member 37 can be attached between the chassis 14 and the raised portion 7 by first threading the externally threaded portion 38 into the chassis 14 with a neck 43 of the rubber member 41 fitted in the hole 29 in the raised portion 7, and then pushing rubber member 42 into the neck 43 of the rubber member 41.

The vibroisolating members 31, 37 shown in FIGS. 5 and 6, respectively, are also effective in sufficiently isolating the disk memory device mechanism in the housing 1 from externally induced vibrations applied to the housing 1.

While the illustrated housing 1 is of a box shape doubling as a shield body in the illustrated arrangement, one of the upper wall 2, the side walls 4, 5, and the rear wall 6 may be dispensed with.

The front panel 9 may be constituted by a front panel of the computer. With this modification, a slot and a hole for inserting the eject botton are defined in the front panel, and the housing 1 accommodating the disk memory device mechanism is fixed to the front panel. A plurality of sets of the slot and hole may be defined in the front panel of the computer, and a plurality of the housings 1 each accommodating the disk memory device mechanism may be attached as an array to the front panel.

While the illustrated vibroisolating members 25, 31, 37 have the rubber members 28, 36, 41 and 42, respectively, the present invention is not limited to such structures. The rubber members 28, 36, 41 and 42 may be replaced with coil springs or resilient bodies of synthetic resin.

With the arrangement of the present invention, the disk memory device can be connected to the computer and can sufficiently isolate the mechanism including the disk drive unit and the head from vibrations so that memory disks can easily and smoothly be inserted into and removed out of the housing through the slot in the front panel. The disk memory device of the invention also has a sightly appearance and is good in product quality.

Although certain preferred embodiments have been shown and described, it should be understood that many changes and modifications may be made therein without departing from the scope of the appended claims.

What is claimed is:

1. A disk memory device comprising:
   a housing including a bottom wall;
   a front panel attached to a front part of the housing and having a lateral slot therein for insertion of a replaceable memory disk into the housing;
   a disk memory device mechanism including a movable guide member for receiving a memory disk inserted through the slot into the housing, a disk drive unit for driving a memory disk lowered by the guide member to a loading position thereon, and a support chassis supporting the guide member and the disk drive unit which is resiliently mounted on the bottom wall of the housing; and
   vibroisolating means mounted between the bottom wall and the support chassis for resiliently holding the support chassis in place and isolating the disk memory device mechanism from the housing such that vibrations applied to the housing are not applied to the disk memory device mechanism,
   whereby the disk memory device mechanism can be operated resiliently isolated from vibrations applied to the housing and with a minimum of any positional error between the insertion slot and the guide member to allow smooth insertion of the memory disk in the housing.

2. A disk memory device according to claim 1, said vibroisolating means comprising a plurality of vibroisolating members each composed of a first rigid portion fixed to said chassis, a second rigid portion fixed to said housing, and a rubber member joined between said first and second rigid portions.

3. A disk memory device according to claim 2, wherein said first rigid portion has an externally threaded portion threaded in said chassis, and said second rigid portion has an internally threaded portion, including a screw inserted through the bottom wall of said housing and threaded into said internally threaded portion.

4. A disk memory device according to claim 1, said vibroisolating means comprising a plurality of vibroisolating members each composed of a rigid portion fixed to said chassis and a rubber member disposed between said rigid portion and said housing.

5. A disk memory device according to claim 4, wherein said vibroisolating member has an externally threaded portion connected to said rigid portion and threaded in said chassis, said rigid portion having a smaller-diameter shank, said rubber member being fitted over said smaller-diameter shank and inserted in a hole defined in the bottom wall of said housing.

6. A disk memory device according to claim 1, said vibroisolating means comprising a plurality of vibroisolating members each composed of a rigid portion fixed to said chassis, a bag-shaped rubber member joined to said rigid portion and said housing, and a bar-shaped rubber member inserted in said bag-shaped rubber member.

7. A disk memory device according to claim 6, wherein said vibroisolating member has an externally threaded portion connected to said rigid portion and threaded in said chassis, said bag-shaped rubber, member having a neck inserted in a hole defined in the bottom wall of said housing, said bar-shaped rubber member being inserted in said neck.

* * * * *